Aug. 4, 1936.  R. E. MARINE  2,049,464
AUTOMOBILE CLOSURE
Filed Jan. 14, 1927  3 Sheets-Sheet 1

INVENTOR
Richard E. Marine

Aug. 4, 1936.   R. E. MARINE   2,049,464

AUTOMOBILE CLOSURE

Filed Jan. 14, 1927   3 Sheets-Sheet 2

INVENTOR
Richard E Marine

Aug. 4, 1936.　　　R. E. MARINE　　　2,049,464
AUTOMOBILE CLOSURE
Filed Jan. 14, 1927　　　3 Sheets-Sheet 3

INVENTOR
Richard E. Marine

Patented Aug. 4, 1936

2,049,464

UNITED STATES PATENT OFFICE 2,049,464

AUTOMOBILE CLOSURE

Richard E. Marine, Pittsburgh, Pa.

Application January 14, 1927, Serial No. 161,179

51 Claims. (Cl. 296—45)

My invention comprehends improvements of general utility in automobile body constructions, either of the closed or open type, and in one of its aspects comprehends their coordination to constitute a new type of "closed" car wherein is embodied the advantages of the "open" car with those of known forms of "closed" car, with the elimination of disadvantages inherent in each, as heretofore constructed.

Among the advantages possessed by the "open" type over the "closed" type of car are, better vision, lighter weight, lower center of gravity, giving greater safety in travel, better pick up and roadability, healthful openness, freedom from the accumulation of noxious gases, absence of hum, drumming, rumbling, rattle and other objectionable noises, greater accessibility and convenience in loading long or cumbersome articles.

In the closed car as ordinarily designed the rear fender cuts into the rear body section and rear door in such manner as to leave in these parts only shallow pockets for storage of the windows. The car sides are made higher than in the "open" type in order to increase the depth of these pockets and this further reduces the aggregate "full open" ventilating capacity of the car. It being possible to only partially lower the windows into the rear body section and rear door and the intervening posts further breaking up the "full open" space, eddies and drafts on the level of the occupant's head are produced when travelling, with their well known deleterious effects. It results that ordinarily this type of car is operated closed, thus excluding the fresh air and the health giving ultra-violet rays of the sun, thereby sacrificing one of the greatest benefits of motoring.

The "closed" car, speaking generally, has a body comprising a framework with bottom and top rigidly connected by end and intermediate posts between which the glass closures are adapted to slide. Such a structure must essentially be rigid throughout and therefore obviously any tendency to distortion under twists or strains, as when one of the car wheels rides over an elevated obstacle, is concentrated upon the weakest points, the joints of the frame, since the intermediate frame sections due to their limited length cannot flex. Creaky joints and broken glass are liable to result. To avoid this the structure, including both the body proper and the glass, are built undesirably heavy, thus raising the center of gravity. The use of an all steel construction only partially solves the problem and results in increased objectionable noises due to the vibrations set up in the unitary metallic structure.

Notwithstanding the disadvantages of the closed car, it has to a large extent displaced the open car because of the unsatisfactory character of the closures of the latter and the inconvenience of storing and manipulating them, whereas the closures of the closed car are conveniently carried in pockets in the sides and are raised to operative position by the single simple operation of sliding them into position.

Many attempts have been made to incorporate in the closed car the advantages of the open car but they have involved such objectionable expedients as closures which will not open with the doors; removable, sliding or hinged posts, or other members which must be manipulated additionally to the manipulation of the closures proper; swinging closures inconvenient to manipulate in the limited space provided; closures which do not even theoretically actually contact with each other to effect a weather-tight seal, and other equally inefficient expedients. These expedients have been lacking in simplicity of operation, have formed inadequate weather seals, have not had sufficiently rigid connection with the doors, have worked loose with wear, and have been subject to rattles, misfit and interference with the proper opening and closing of the doors and could in most cases only be used where full depth side pockets could be provided. They were therefore incapable of effecting closure of the door or body space above the rear fender. They did not constitute a satisfactory or a general solution of the problems presented.

My invention in its more comprehensive aspect contemplates the construction of a new type of closed car from which are eliminated all of the enumerated disadvantages, and others, of known types while retaining their advantages and in which the many advantages of the open type of car are incorporated.

To this end I effect the elimination of all intermediate stationary body posts and permanent door posts or guides, all removable, folding, or sliding posts or guides or other instrumentalities requiring special manipulation, all leaky free spaces between adjacent closures and effect the movement of the closures from storage to operative position and a contacting weather-tight seal between them, of a character to permit the free opening and closing of the doors, by a single simple sliding operation of each closure, with the same facility of operation as obtains in the modern type of closed car. This constitutes broadly the central idea of invention common to the several special forms devised by me and to which other features evolved by me contribute to effect a practical complete operative whole.

In one form of my invention I accomplish these results by the expedient of providing a continuous or substantially continuous pocket in each side of the car, from front to rear, extending through the doors and rear body panel, for the storage of the corresponding closures, whereby the adjacent vertical edges of consecutive closures are brought substantially into direct contact with each other and, at the hinge ends of the sections, may even conveniently overlap each other, or be integrally provided with tongues and grooves respectively, whereby to effect a weather-tight seal throughout. The usual stationary body panel between car doors is preferably omitted and the doors are brought directly together, edge to edge, abutting on their inner surfaces a post with which they preferably have tongue and groove connection to form a weather seal. Where the free ends of two car doors are located adjacent each other, the edges of their closures cannot overlap because this would not permit unobstructed opening of the door whose closure is provided with the inner overlap. Where closure frames of substantially the thickness of the car side, as devised by me, are employed, an accurate straight edge fit without overlap may be restorted to to bring the edges of adjacent door closures approximately together to protect against the weather while permitting free opening and closing of each door, but in general it is desirable to employ a positive weather seal between adjacent door closures. As a further important feature of my invention, I have devised self-expanding and self-retracting means for either one or both of two adjacent door or other closures whereby perfect freedom in opening and closing a door or doors, a perfect contacting weather-tight seal, with weather overlap if desired, and non-interference with the raising and lowering of the closures in their storage pockets are inherently obtained. Such means must be rugged, sensitive, effective, durable with wear and when subject to the weather and must not be liable to get out of order. In the detailed description are disclosed several illustrative species devised by me as exemplifications of the generic idea of invention here involved.

Moreover, my closures are not limited in their sphere of operation to locations where full depth side pockets are available but may be employed where the depth of the storage pockets are limited, as in the space above the rear fender. To this end my invention contemplates the provision of closures with telescopic self-expansible and self-retractible sections whereby the closures may be fully lowered, or when raised will effect a contacting weather-tight seal with adjacent closures,—all responsive merely to a single simple sliding operation, as in present day commercial types of closed cars.

As a further important feature of my invention, the pocket which extends from end to end of a side or door section preferably terminates in vertical guideways of greater width than the intermediate portion of the pocket, and preferably of a width approximately the thickness of the section itself. The closure has a relatively thin bottom frame member adapted to slide in the intermediate portion of the pocket, end frame members of a thickness to fit and slide in said vertical guideways and a top frame member of substantially the thickness of the end frame members. This arrangement prevents the closure becoming displaced endwise from its open ended pocket. Moreover, the thick end frame member together with the top frame member of the same thickness conform to the thickness of the side of the car, enhancing its appearance and providing a structure of great lateral strength. The corner angles of the frame are preferably strengthened by inwardly curved brace members or frame extensions, integral therewith, or welded or otherwise secured in place. The frame members are conveniently pressed out of thin sheet metal such as steel, preferably rust proof, or duralumin, or other rust proof alloys, or bakelite or similar sheet materials may be employed, and each end frame member is preferably made as narrow, longitudinally of the car, as is consistent with the adequate securing of the glass window therein and is preferably of flattened triangular shape in cross-section whereby a maximum of "vision", strength and lightness is obtained, not possible with prior art window end frame members which because of the character of the guideways employed are essentially materially thinner than the sides of the car but extend a greater distance longitudinally of the car sides in order to obtain adequate strength, thus offering not only a greater obstruction to vision than mine, but also having less strength laterally of the car side, in which direction the greatest strains and pressures are encountered, my construction has the additional advantage that special abutments in the door jambs are unnecessary, as where narrow posts are used. My top frame member also serves as a finish strip, when in lowermost position, for the top edge of the car side, completely covering the slot therein and presenting a continuous surface over said edge and of a width substantially equal to the thickness of the car side.

As further important features of my invention, the car side sections are provided with frame posts at their ends through which pass the storage pockets and in which are formed the closure end guideways and each such post is provided at its top with a seat in which a corresponding part on the bottom member of the closure frame, or a part of such member itself, is adapted to engage and means, preferably automatic, are provided for forcing and firmly and rigidly clamping the member in its seat in order that the closure, when raised, and the corresponding car section may operate as an integral unit not subject to rattling or loosening with wear or usage. To this purpose the parts may advantageously be made wedge shaped and provided with wedge or cam-like means for inflexibly binding themselves together. The posts are preferably of sheet metal and may be pressed out of an integral extension of the sheet metal sheathing constituting the side of the section itself, or may be separate therefrom but secured thereto by welding or the like. The seat if desired may extend the full length of the section.

In modified forms of my invention the closure pockets in the several sections, on each side of the car, are not strictly continuous throughout but the sections are provided with thin end walls. Also the pockets of adjacent doors may be separated by a narrow stationary body panel so long as such walls or panels are not of sufficient thickness to interfere with the efficient bridging of the space between adjacent closures, when raised, by the self-expansible means. Or in a still further modification, notwithstanding the limitations imposed by the rear fenders, I may employ integral one-piece closures for the rear side sections which by a simple horizontal sliding operation are, for storage purposes, moved to the inner or outer side of and preferably into engagement with, or telescoped into the frame of the front door closure, which in turn may be lowered by a simple sliding operation into the full sized pocket in the front door, there thus being required only a single simple sliding operation for each closure, as in present commercial types of closed cars.

Inasmuch as with my improved closures the conventional rigidly mounted top structure with heavy intermediate posts connected to the top by rigid joints is dispensed with, the top structure may be made materially lighter, being supported at its ends, only, whereby the inherent resiliency of the whole structure relieves the corner joints of excessive strain, thus minimizing the likelihood of loose or creaking joints while the glass closures are relieved of the danger of breakage because they are not bound in post and top end guideways but have a certain freedom of motion of their own. To provide adequate strength in such a structure, I conveniently employ on each side a horizontal top side frame member, preferably tubular, though not necessarily circular in cross-section, the outline in cross-section advantageously being that desired for the sides and eaves of the top and to form a door frame and roof supporting member. My invention further contemplates providing the top and conveniently said side frame members thereof with hinge and movement limiting members for automatic attachment to the hinge ends of the tops of the respective closure frames when the latter are moved into operative position. The end members of the main top supporting frame may likewise advantageously be tubular and of any convenient shape in cross-section adapted to their intended functions and the windshield posts may advantageously be connected just below the windshield by an angle plate conforming to the curvature of the cowl. All frame corners in the planes of the front, rear and sides respectively are preferably provided with inwardly curved corner braces to impart to the structure the well known strength characteristics of an arch.

Inasmuch as my closure systems are supported only by the car body proper and no intermediate posts are required to serve as guides or supports therefor, they are admirably adapted for use with a top of the let down or folding type, the side closures being either lowered or raised when the top is down—in accordance with the wishes of the occupants of the car. It is thus possible when conditions are favorable for the occupants to receive the full benefit of sun light while being protected against drafts, or when weather conditions are unfavorable to be quickly shielded therefrom.

My invention further consists in such other new and useful improvements, and has for further objects such other operative advantages and results, as obtain in constructions hereinafter described or claimed.

In the accompanying drawings, forming a part of this specification, and showing for purposes of exemplification preferred forms and manners in which the invention may be embodied and practiced but without limiting the claimed invention to such instance or instances:

Figure 1 is a side elevation of a car body embodying one form of my invention.

Fig. 2 is a horizontal section on the line 2—2 of Fig. 1.

Fig. 2a is a fragmentary horizontal section similar to Fig. 2 but showing a modified form of car closure.

Fig. 3 is a fragmentary perspective view of a closure storage pocket and a sectional closure adapted to be stored therein, the parts being shown separated for clearness.

Figs. 4 and 4a are cross-sectional views of different forms of closure top frame member.

Fig. 5 is a fragmentary vertical sectional view of the lower end of the upper closure section shown in Fig. 3.

Figs. 6, 6a and 6b are horizontal sections of different forms of body or door frame posts adapted to serve as guideways and supporting means for the closures.

Figs. 7 and 7a are vertical sections of different forms of posts.

Figs. 8 and 8a are perspective views of different forms of hinge attachment for the closures when raised, and Fig. 8b is a cross section on the line 8b—8b of Fig. 8a.

Fig. 11 is a part side-elevation, part sectional view of the same.

Fig. 14 shows in side elevation a further modified system of closures applied to a car of the "coach" type.

Fig. 14a is a section on the line 14a—14a of Fig. 14.

Fig. 14b is a section on the line 14b—14b of Fig. 14.

Fig. 14c is a section on the line 14c—14c of Fig. 14.

Fig. 14d is a section on the line 14d—14d of Fig. 14a.

Fig. 14e is a horizontal section of a slightly modified form of the system shown in Fig. 14a.

Fig. 14f is a fragmentary view similar to Fig. 14a but showing a still further modification.

Fig. 15 shows the system of Fig. 14 extended to a sedan type of car, with full doors.

Fig. 16 shows the system of Fig. 14 extended to a sedan type of car, having its front door, only, of full size.

Fig. 16a is a section on the line 16a—16a of Fig. 16.

Fig. 16b is a section on the line 16b—16b of Fig. 16.

Fig. 16c is a slight modification of the showing of Fig. 16b.

Fig. 16d is a section on the line 16d—16d of Fig. 16, partly broken away.

Figs. 16e and 16f are rear views of slightly different forms which may be given to the windshield post of Fig. 14a.

Similar reference characters refer to similar parts throughout the several views.

Figures 1, 2, 8, 8A, 8B:
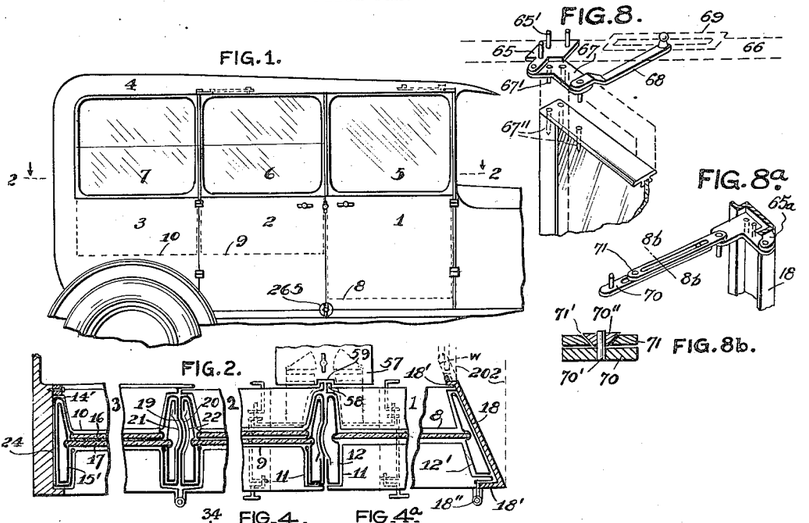

Referring to the drawings, there is shown in Figs. 1 and 2 front and rear door sections 1 and 2 respectively and body section 3, top 4 and closures 5, 6 and 7. In the doors are provided closure pockets 8 and 9 and in the body section a closure pocket 10. As will appear from Fig. 1, the rear fender limits the depth of the closure pockets in the body section and rear door, thus necessitating the use of sectional closures therein.

As shown in Fig. 2, the pockets 8, 9 and 10 extend entirely through their respective sections and terminate in widened, open ended guideways 11, substantially the width of the respective sections. Each closure is provided with a frame, having widened end members 12 fitting in the guideways 11, both end members and guideways in cross section preferably being substantially flat or triangular in shape as shown, for instance, in Figs. 2 and 9, the outer ends in the former figure being shown flattened to enhance the appearance of the frame. Since these end frame members are wider than the intermediate portions of the frame members in the pockets 8, 9 and 10 respectively, they prevent displacement of the closure frames endwise in said pockets. The end frame member 12' of the front closure 5 is shown in Figure 2 as lying within a recess in the windshield post 18, the other end member being contiguous to the corresponding member of the adjacent door, said doors being hinged at their forward and rear ends respectively. The closure 6 comprises two telescopic sections, the lower section having end frame members 14 and the upper frame section having end members 15, the latter being adapted to telescope into the former and each adapted to support the corresponding end of the glass pane sections 16 and 17 respectively. Adjacent closures are shown as having tongue and groove connections with each other to effect a weather-tight seal between them. In order that the adjacent free ends of the door closures shall have perfect freedom of motion independently of each other, while still preserving a weather-tight seal between them when closed, the tongue on the rear end frame member of the forward door is made flexible and provided with one free end overlapping the corresponding end of the main portion of the frame member, as shown in Fig. 2, the tongue member being advantageously made of materially thinner spring metal, either made separately and welded to the main portion or struck out integrally therewith and rolled until it is sufficiently thin to give the requisite resiliency. The end frame members 14 of the lower sections of the telescopic sections are shown in Fig. 2 as provided with rigid tongue and groove connections 19 and 20 at the ends of the rear door and body sections, this being permissible at the hinged end of the said door because at such end there is no interference between tongue and groove in opening and closing the door. The end frame members 15 of the upper sections are preferably provided with resilient tongue and groove members 21 and 22 of the general character hereinbefore referred to. The rear end frame members 14' 15' of the body section closure are located in a recess or guideway 24. It will be apparent from the foregoing that when the respective closures are raised a perfect contacting weather-tight seal will exist between them, while the resilient tongues and grooves at the free ends of the respective doors permit unrestricted opening and closing of them.

Figures 2A, 3, 4, 4A, 5, 6, 6A, 7, 7A:
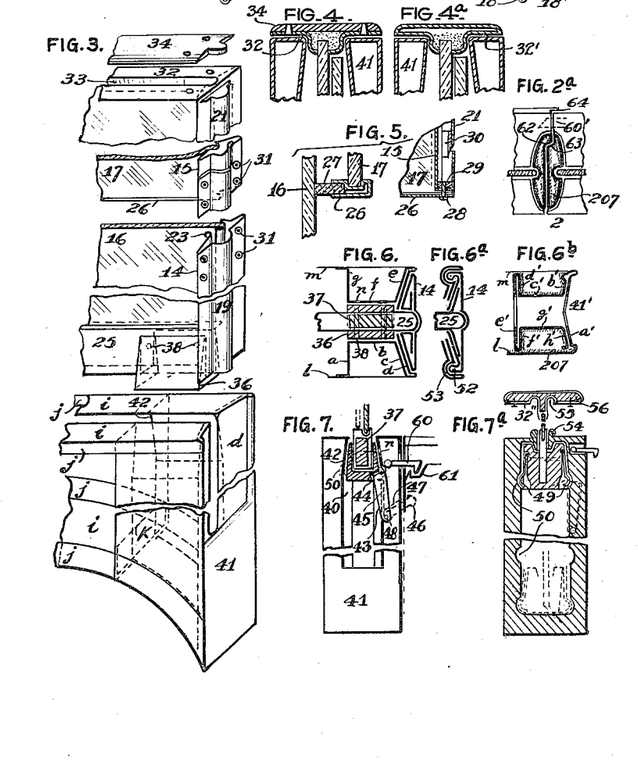

As shown in Fig. 3, the bottom frame member 25 is rigidly connected to the lower end member 14, the latter being provided with an open top into which the end frame member 15 of the upper section may be inserted, sufficient space existing between the free edge 23 and the lower pane 16 for the passage of the upper pane 17. In order to retain the upper pane in its frame, there may be employed a bridge member 26 of the configuration shown in cross section in Fig. 5, provided with a weather strip 27 between its walls to effect a weather-tight seal between the upper and lower panes, the ends of said bridge member being secured to the end members as by bolts 28 passing through nuts 29 secured in the lower ends of the upper end members. In order that the resilient tongue 21 of the upper end member 15 may be properly guided into the lower end member 14 when the closure is lowered, a member 30 with inclined outer edge as shown in Fig. 5 is conveniently welded thereto, or a similar surface might be formed integrally with the tongue itself by an appropriate forming operation. Detents 31 may conveniently be provided at the upper end of the end member 14 and at the lower end of the end member 15 to insure that the upper section is retained in elevated position when the closures are raised. The top frame member 32 of the upper section may conveniently be provided with a slot 33 (Figs. 3, 4), said slot being advantageously formed by making a central slit longitudinally of the top member and bending the edges down to form extensions adapted to hold the pane 17 at its top edge and a finish strip 34 is suitably attached to the frame member 32 as by screws. This strip may be readily removed to permit replacement of the glass pane and also affords the finish for the top edge of the body section when the closure is lowered. In Fig. 4a is shown a top frame member 32' bent as shown from an integral blank, this form being particularly adapted to a sectioned closure which permits its upper pane to be replaced by removal of the bridge member 26. It will be obvious that since the frame members are substantially as broad as the thickness of the car sides and since they are braced in a vertical direction by the downturned glass receiving flanges, which may be made as deep as desirable for the purpose of bracing them in a vertical direction, and since the corners of the frames are further braced by angle plates which may be made integral with the downturned flanges, a very rigid frame structure results.

The bottom frame member 25 is of the same width as the pocket and may conveniently be made of sheet metal as shown in Fig. 7 and is provided near each end with a wedge member 36, a block 37 being also preferably provided on the interior of the frame member 25 at each end only, the wedge frame member and block being secured together by bolts 38. The bottom frame member 25 may be secured to the lower end of the end frame member 14 in any suitable manner, such as shown in Figs. 6 and 6a, in which all of the contacting surfaces between said members as shown are conveniently welded together.

Each wedge member 36 is adapted to slide in a guideway 40, formed in a post 41, at each end of each door and body section, the guideways terminating in wedge shaped seats 42 into which the wedge of the closure is firmly forced and locked when raised, as by a wedge, toggle or cam mechanism or other mechanism, insuring rigidity and operation of the closure and door or body section as an integral structure that will not be loosened by shocks or vibrations. As shown in Fig. 7 a cam 43, operating against a cam surface 44 in the wedge member 36 is shown by way of illustrative example. Primarily this cam is thrown automatically into engagement by means of a spring 45 and is released by a hand lever 46 which also serves as a stop in connection with its slot 47 to prevent the member 43 from contacting the glass pane of the closure when the latter is lowered. The cam levers at opposite ends of a section are conveniently connected by a rod 48, journaled in the end posts (Fig. 11) to which the hand lever 46 may be conveniently be attached to simultaneously operate both cam members 43. Each wedge 36 is advantageously provided with springs 49 adapted to seat in recesses 50 and also adapted at all times to frictionally engage the sides of the guideway 40 to prevent vibration or rattle and to hold said closure in lowermost position, or in other positions if desired.

Each end post 41 may be formed as shown in Figs. 3 and 6 from a single sheet metal blank by bending the same to form the successive sections $a$, $b$, $c$, $d$, $e$, $f$ and $g$, the section $d$ being slotted part way down for the passage of the bottom frame member 25. If desired, the posts at opposite ends of a section may be connected by frame members $i$, $j$ at top and bottom and the inner side of each post may be braced by a bottom brace member $k$ (Fig. 3). The usual outer sheathing $l$ and inner facing $m$ are appropriately attached to the posts and each post is conveniently provided with openings $n$ (Fig. 7), permitting removal of the bolts 38 when it is desired to remove the closure from its pocket for repairs.

Figures 14, 14A, 14B, 14C, 14D, 14E, 14F, 16, 16A, 16B, 16C, 16D:
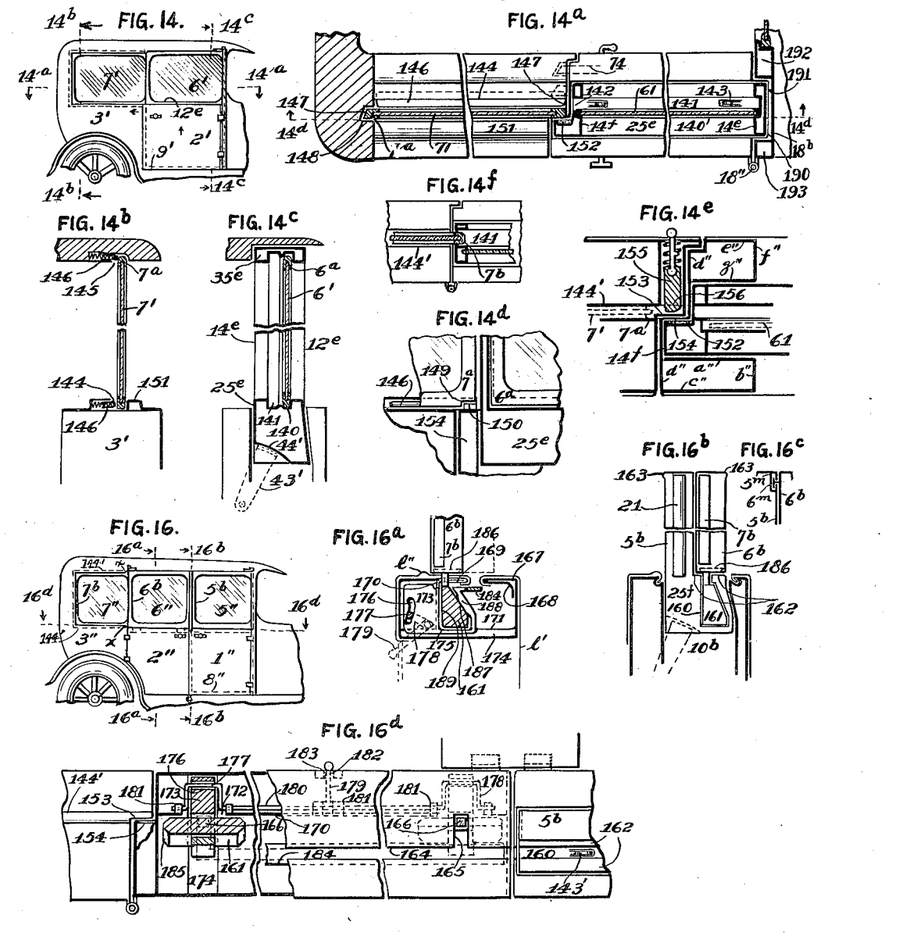

In Fig. 6$^a$ the closure end frame member and post are provided with tongue and groove connections 52, 53 serving as a brace for the sides of the post. In Fig. 6$^b$ the post is shown as an integral part of the sheathing $l$ itself, being formed by bending the end or ends of the latter respectively to form the consecutive sections $a'$, $b'$, $c'$, $d'$, $e'$, $f'$, $g'$ and $h'$. The contacting surfaces of the several sections in all of the posts are preferably welded together. The post may also be made as shown in Fig. 14$^e$ by bending a plane sheet metal blank into the successive sections $a''$, $b''$, $c''$, $d''$, $e''$, $f''$ and $g''$. In Fig. 7$^a$ the post is shown as cast and provided on opposite sides of its top with knobs 54 seating in recesses 55 in the top frame member 32'', reinforcing end blocks 56 being advantageously disposed therein. The downwardly extending tongues which grip the pane also serve as resilient members to normally hold the parts in place when the closure is lowered.

My system involves the elimination of the intermediate body panel between adjacent doors and in Fig. 2 the adjacent free inner edges of the doors abut a post 57 conveniently formed on the end of the front car seat, a tongue and groove connection 58, 59 being formed between the doors and the post to effect a weather seal. The tongue and groove arrangement may be reversed as shown at 58' and 59' in Fig. 9. Latches 60 on the doors are adapted to engage a double socket 61, as shown in Fig. 7.

In Fig. 2$^a$ is diagrammatically shown an arrangement suitable for a coach construction, in which there is a direct contact overlapping engagement 62, 63 between the closure in the door section and that in the body section; a weather overlap 64 is also provided between the door proper and the body section. A suitable latch 60' is employed to secure the door in closed position. This latch may conveniently be located on the outside of the closure frames rather than on the inside thereof, as shown, in order to avoid engagement with the closure frames in opening and closing the door.

In Fig. 8 is shown a hinge 65 for the upper end of a door closure in alignment with the door hinges themselves, having its fixed member secured by fasteners 65' to the top of the door jamb 66, a member 67 being pivoted thereto, the latter being provided with studs 67' adapted to engage corresponding sockets 67'' in the top frame member of the closure, said sockets preferably being reinforced as by metallic thimbles and extending into the deeper portions of the upper frame member, as for instance those portions lying directly above the end frame member and the downwardly turned portions of the top frame member, care being taken not to cause a breakage of the glass panes. A limiting device 68, having a pin and slot connection with a stationary plate 69 attached longitudinally of the door jamb, is also preferably provided. In Figs. 8$^a$ and 8$^b$ is shown a modification of the closure hinge, comprising sliding or telescope parts 70, 71, having a pin and slot connection 70' and 71' with each other, the pin being preferably provided with a roller bearing 70'', having inclined sides as shown to engage similarly inclined sides of the slot. The hinge 65$^a$ in this instance is shown attached to or integral with the windshield post and having pivoted thereto its movable member 67$^a$.

Figure 9:
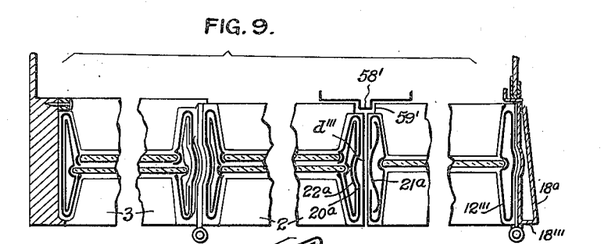
Fig. 9 is a horizontal section similar to Fig. 2 but showing a modified system of closures and pockets.
Figures 9A, 9B, 9C, 9D, 9G, 9H:
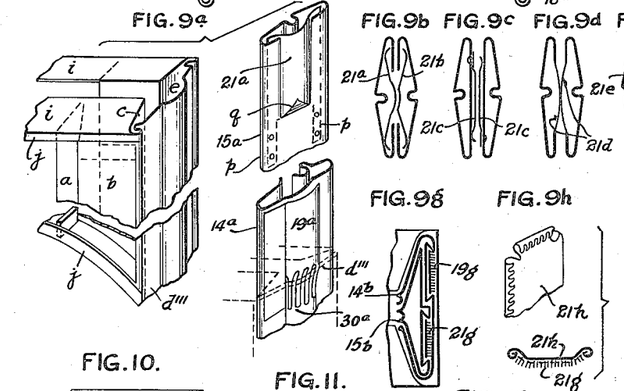
Fig. 9a is a fragmentary perspective view of a closure storage pocket and sectional closures adapted to be contained therein, of the system shown in Fig. 9, the parts being separated for clearness.
Figs. 9b to 9i show further modifications of means for effecting contacting weather tight seals between adjacent relatively movable closures.

In Fig. 9 is shown a modification in which the posts of the door and body sections are not provided with open ended pockets but the post section $d'''$ is not slotted and is separated from the sections $c$ and $e$ to form a thin wall between which and the inner portions of the post the end frames of the closure slide. In order to effect a contacting weather-tight seal between all adjacent closures when raised, the lower closure end member 14$^a$ at the hinge end of the body section may advantageously be provided with a resilient tongue 19$^a$ welded or pivoted thereto, as shown in Figs 9 and 9$^a$, although by reason of the extreme thinness of the walls $d'''$ of adjacent door and body sections, this may in some cases be dispensed with. In order that the tongue may be properly guided into its storage pocket when lowered, its lower end is slotted at 30$^a$ and the slotted portions bent inwardly into engagement with the inner surface of the wall $d'''$, the slots preventing buckling when closure is lowered. The resilient tongue member 21$^a$ of the upper frame section in Fig. 9$^a$ is shown as free at both of its edges and terminating at its lower end in two legs $p$, connected by inclined portions $q$ for retracting said tongue when the upper section is telescoped into the lower. The spring tongue 21$^a$ in the front door closure end frame in Fig. 9 may if desired be offset slightly outwardly in its upper half, corresponding to the displacement of the fixed groove 22$^a$ of the upper section of the adjacent door closure frame behind the fixed groove 20$^a$ of the lower section of said frame to effect a more perfect seal, although because of the smallness of this displacement this in general will not be necessary.

Figures 9E, 9F:
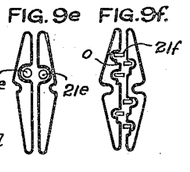
Figure 9I:
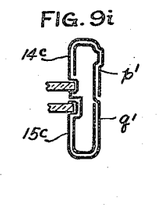

In Figs. 9b to 9h I have shown various forms devised by me which may be employed in any of my systems to effect contacting weather-tight seals between adjacent vertically sliding closures. In Fig. 9b I have shown free edge resilient tongue and groove members 21a and 21b, respectively, riding in open ended slots which they normally tend to keep closed. In Fig. 9c I have shown flexible flattened tonguelike members 21c, preferably welded or otherwise secured at one edge only to its corresponding closure frame member, extensive engagement of the respective flattened surfaces with each other being sufficient to effect a weather seal and the respective members being preferably secured to the frames at opposite ends. In Fig. 9d is shown an arrangement in which the sheet metal from which the closure frame is pressed is rolled very thin in portions 21d to give substantially the same effect as in Fig. 9c. It is quite possible to roll steel of the proper quality for instance to satisfy the condition of great flexibility and durability, particularly if rust proofed, and this constitutes a very effective and simple form of weather closure. In Fig. 9e the closure frames are shown as provided with undercut vertically extending recesses in which are located freely expansible members 21e. These may conveniently be tubular, such as thin rolled steel of the character specified for Fig. 9d or spring brass, or other suitable material, and are susceptible of ready replacement when desirable. In Fig. 9f are shown staggered vertically extending, flexible members 21f, such for instance as felt strips located in recesses in the faces of the closure end members, there being provided adjacent each strip a recess or pocket $o$ to accommodate the free end of the strip when the closure is lowered into its storage pocket. In Fig. 9g are shown telescopic sections, each provided in vertically extending undercut recesses with expansible members 19g and 21g. These members may conveniently take the form shown in Fig. 9h in which a sheet metal base piece 21h is provided, having cut out corners and side, top and bottom edges turned down and then each reversibly turned, the free edges being provided with cut out teeth adapted to hold, for instance, a fabric such as mohair 21g or similar material self-expansible and readily retractible, in engagement with the sheet metal base, the unit being insertible in a pocket of the character shown in Fig. 9g and flattened into position, or if desired may be only partially flattened to take advantage of the resiliency of the sheet metal. In Fig. 9i are shown telescopic frame sections 14c and 15c so disposed that when they are extended the portion $p'$ of one section will lie in the same plane with portion $q'$ of the other section, thereby providing uniform contact with an adjacent closure frame member.

Figure 10:
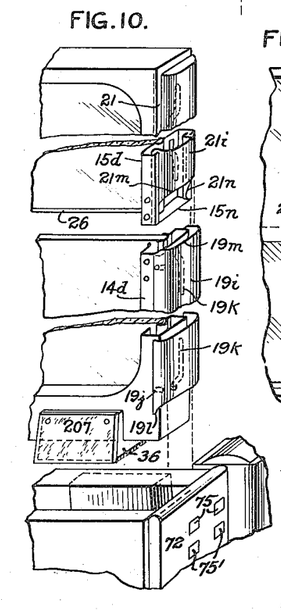
Fig. 10 is a fragmentary perspective view of a further modified form of closure system.
Figures 12, 13, 17, 17A, 17B, 17C:
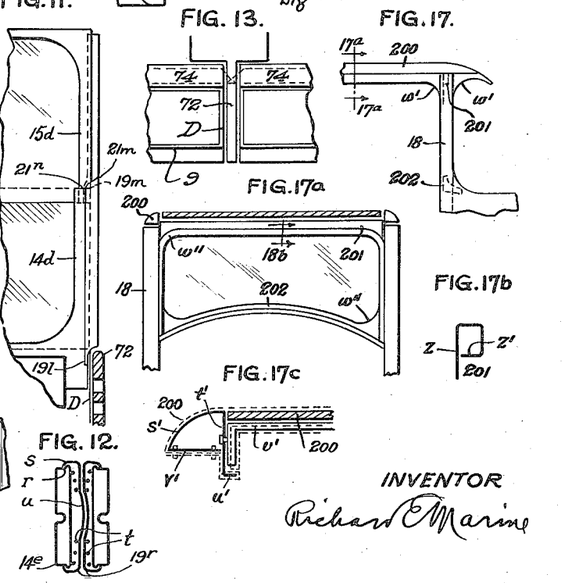
Fig. 12 is a cross-section of a modified form of expansible weather tight seal for the system of Fig. 10.
Fig. 13 is a top plan view of the system shown in Fig. 10, with the closures in lowered position.
Figs. 17, 17a, 17b, and 17c show constructional details of my top supporting structure, Figs. 17 and 17a being respectively side and front elevations of the same, with parts broken away, Fig. 17b being a section on the line 17b of Fig. 17a and Fig. 17c being a section on the line 17c of Fig. 17.

In Figs. 10, 11 and 13 is shown a modified form of my closure system adapted for use when a narrow panel 72 is employed between the adjacent free edges of the front and rear doors and the door pockets are closed at their ends by thin end walls D. The lower closure section 14d in this case is provided with an expansible member 19i shown as having a pin and slot connection 19j with the frame of the lower section; the lower end of the expansion member is curved downwardly at 19l to fit over the top of the panel 72 and end wall D when the closure is raised and adapted to guide the expansion member into the pocket when it is lowered. Suitable springs 19k secured at one end to the main frame end member and bearing their free ends against the expansion member may be employed to urge the latter outwardly. While these are shown arranged in single file for simplicity, a better balance is obtained where they are arranged in pairs. The upper telescopic section 15d is provided with an expansion member 21i shown as resiliently connected thereto by overlapping their respective free edges and providing springs between them as in the lower section. The lower edge of the expansion member 21i is curved inwardly to form legs 21n, retained in place by the flange 15n on the section 15d. The legs 21n of the upper section 21i pass into the top of the lower end member and are adapted when the closures are lowered to direct the upper expansion member into its storage position in the lower end frame section. When the upper section is raised, the expansion member 21i is pressed outwardly by the springs to locate its lower flat edge 21m on the corresponding flat edge 19m of the lower expansion member 19l. In Fig. 13 is diagrammatically shown the arrangement of parts when the closures are lowered, the latches 74 for securing the door to the central panel being shown in dotted lines. Due to the extreme thinness of this panel, these latches are located at different elevations and are adapted to engage different super-imposed pairs 75, 75' of latch sockets in the panel, as shown in Figs. 10 and 11.

In Fig. 12 are shown one piece end frames 14e, provided with expansion members 19r resiliently pressed outwardly by springs $t$, said springs being of spiral form when expanded so that when fully retracted the several coils of a given spring will lie in the same plane, thus taking up a minimum of storage space. The expansion members may be given a configuration to provide tongue and groove overlap, as shown at $u$ and the movement of the expansion members may be limited by suitably bending the exterior corner edges of the main frame members outwardly to form stops $r$ for the downturned ends $s$ of the expansion members.

Figures 15, 16F:
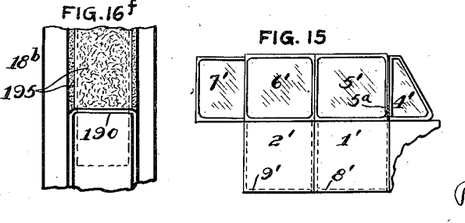
Figure 16E:
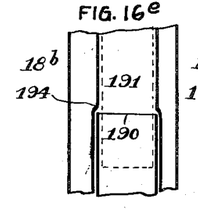

The foregoing systems for effecting full open sides for vehicles of the closed type involve the use of a two-section closure over those portions of the car sides, the depths of whose pockets are restricted by the rear fender. Such systems may be much simplified by so designing the car body and chassis that both front and rear doors may have pockets of full depth, for in this case every door closure may be made of integral construction and only the rear window 7 need be sectionalized and since this is stored in a stationary part of the car side, it is not subject to the severe operating conditions imposed upon door closures. I have, however, devised a modification of the foregoing systems whereby an open sided car may be provided with contacting, weather tight closures, each operable by a single, simple sliding operation, as before, but with each closure of integral construction regardless of its propinquity to the rear fenders. This is broadly effected by storing the several closures on each side in a single full size pocket in the front door and providing means whereby each closure may be slid from its storage position into its operative position by a single, simple sliding operation. Several typical forms of such a system given by way of example are shown in Figs. 14, 15 and 16.

In Figs. 14 to 14f the modified invention is shown applied to a closed car of the so called "coach" type having a door 2', provided with a pocket 9', into which slides the front window 6', whose main supporting frame is in turn provided with an open ended storage pocket to receive the rear window 7', in which position the windows may be operated as such or, when desired, this frame carrying with it the front and rear windows, may be lowered into the storage pocket 9'. Other guiding and retaining means, such for instance as a tongue and groove connection between the adjacent upper and lower horizontal sides of the front and rear window frames, may be employed, whereby the rear window may by a single, simple sliding operation be moved horizontally into operative position over the car side portion 3' or to storage position laterally against the forward window frame. As a concrete embodiment of this invention, the front-closure frame 12e is shown as of flattened metallic tubular construction substantially rectangular in cross section, the front end member 14e, the rear end member 14f, the top member 35e and the bottom wedge-shaped member 25e being provided with a continuous pair of parallel grooves 140, 141 on their inner faces. The groove 140 retains in place the forward window 6' with its frame 6a which may be removably installed by inserting its upper edge in the groove in the top member 35e, lifting and then allowing it to drop into the groove in the lower member 25e while still being engaged at the top. The wedge-shaped bottom member 25e may be raised and lowered by mechanism similar to that already described and if desired may be locked, against rattling and vibration, in its correspondingly wedge-shaped seat, by forcing the cam 43' into engagement with the impressed cam surface 44' therein.

The groove 141 is extended through the rear end member 14f to form a full open slot 142 thru which the rear window 7' with its frame 7a may be slid. The groove 141 in the upper and lower frame members, or at least in one of said members, is preferably provided with spring tongues or detents 143 to engage the closure frame 7a when in storage position, to firmly hold it there and to prevent rattling. To the same purpose the frame members 6a and 7a may advantageously be covered with plush, mohair or other suitable fabric, rubber or the like. The rear side section 3' is provided in its top with a groove 144 in alignment with the groove 141 and a similar groove 145 is provided in the top of the car. If it is desired that the rear window 7' be in alignment with the front window 6' when both are in operative position, these grooves may be widened and provided with spring pressed plates 146, as shown, the forward edges of the plates and the rear edge of the frame 7a being beveled as at 147, whereby movement of the frame from the pocket formed by the grooves 141 will first retract the plate but after the frame has passed into the grooves 144 and 145, the plate will force it forward across the widened grooves into alignment with the front window 6' and groove 146 in the rear of the car body. At the same time the notch 149 in the forward end of the frame 7a will take over the stationary block 150 to lock the frame against forward movement. The groove 144 is shown as formed in the pressed-up extension 151 on the top face of the body section 3', in alignment with the projecting upper portion of the bottom member 25e but obviously it may be formed in the top face of the section 3' proper, the top face of the bottom member 25e being lowered accordingly to maintain the grooves 141 and 144 in alignment. In order that the padded face 152 of the overlap extension of the rear end member 14f may make actual weather sealing contact with the front side face of the frame 7a when the latter is in operative position, the stationary abutment 153 of the rear body section 3' is set inside of said side face of the frame 7a and the door end post portion 154 is located substantially flush therewith, as shown in detail in Figs. 14d and 14e. In Fig. 14e the spring pressed plates 146 are dispensed with, the groove 144' being substantially the width of the frame 7a, the final positions of the closures 6' and 7' being not in exact alignment. In this modification a spring pressed detent 155 is provided, having its forward edge beveled at 156 to permit its automatic retraction when the frame 7a is slid rearwardly from its storage position in the front closure frame, and serving by automatic engagement with the notch 149 to lock the rear closure in its operative position. When it is desired to return the rear closure to storage position the detent is manually retracted.

In Fig. 14f is shown a coach door hinged at its rear end. In this case the forward end 7b of the rear closure frame when in its operative position may be permitted to project into the forward closure frame pocket to effect a weather overlap, said end being suitably beveled to prevent interference with the opening and closing of the door.

In Fig. 15 is shown a sedan arrangement having two full sized doors, the rear door pocket affording storage for the windows 6' and 7', as already described, in connection with Fig. 14, while the front door 1' affords storage for the window 5' and windshield wing window 4' which telescopes into the frame 5a of window 5' in a similar manner.

In Figs. 16 to 16d is illustrated a mode of applying the modified invention to the "sedan" type of closed car with only one full sized door. As here shown, the rear window 7'' with its frame 7b is slidable horizontally into the frame 6b of the window 6'', for storage purpose, similarly to the method employed in Fig. 14, and the resulting assembly is guided by an appropriate guideway in the top of the door 2'', first laterally out of alignment with the frame of the front window 5'' and then longitudinally to a position alongside of the latter frame and over the door 1'', from which position all of the windows as an interlocking assembly may be simultaneously lowered into the pocket 8'' in the front door 1''. If desired, separate guideways for the windows 6'' and 5'' may be provided in the pocket 8'' so that the operation of one may not be dependent upon that of the other, altho simplicity of operation and compactness would favor the former construction.

The front window frame 5b (Fig. 16b) is shown provided with a wedge-shaped base 25f, having a guideway 160 extending substantially the full length of the frame and designed to receive the base supporting members 161 firmly attached to or integral with the frame 6b, which in turn receives the rear window frame 7b with its window 7''. The entire ensemble constitutes a closure superstructure with a wedge-shaped base which can be raised and lowered and locked in elevated position in the manner herein before disclosed for other forms of my invention. When raised, the shelf-like portions 162 of the base supplement the frame 5ᵇ in substantially closing the top of the pocket 10ᵇ. When lowered, the tops of the frames 5ᵇ and 6ᵇ perform the same function and are preferably provided with slight protuberances 163 for effecting a wedging action to firmly bind the parts against vibration and rattling. The base 25ᶠ is preferably provided with spring detents 143' adapted to firmly but yieldingly hold the frame 6ᵇ and the frame 5ᵇ together against displacement and vibration and appropriate means may also conveniently be employed, if desired, for releasably locking said frames together at their tops, as by a headed stud 6ᵐ on the rear upper edge of the frame 6ᵇ taking into an open ended and slotted recess 5ᵐ in the rear upper edges of the frame 5ᵇ, the parts preferably sliding to a wedge tight fit.

In order to guide the frame member 6ᵇ, when raised, into operative position over the door 2″, the latter is provided in its top edge with a groove or guideway 164 in substantial alignment with the guideway 160 in the base 25ᶠ, both guideways extending through the adjacent end walls of their respective doors (Fig. 16ᵈ). In order to bring the frame 6ᵇ, which should be of the same width as the frame 5ᵇ, into alignment with the latter after the former has been moved to its position over the door 2″ and to lock it against longitudinal displacement, the guideway 164 is provided with a pair of laterally extending offset or transverse guideways 165 corresponding respectively to the pair of base supporting members 161. The stems 166 which connect the base supporting members 161 to the frame 6ᵇ and which pass through the tops of the guideways are preferably made as narrow as the required strength of the structure will permit in order that the tops of the guideways may be made as narrow as possible to preserve the appearance of the top of the door 2″ and prevent the unnecessary introduction of water and other foreign matter. The guideway 164 terminates at the rear transverse guideway 165, as shown in dotted lines, in order to serve as a stop to correctly align the stems 166 with the transverse guideways. As a supporting structure for these guideways and associated operating mechanism, the door 2″ is preferably provided at its top with a longitudinal frame member 167, conveniently of stiff sheet metal, secured at its ends to the end walls or end posts of the door frame. This frame may be formed in any convenient way. In the form shown, it is bent from a rectangular blank into rectangular shape in cross-section, having one of its edges bent under and at an angle across the outer corner, with its free edge preferably welded to its outer side to constitute a brace 168 and at its opposite side it is bent back or folded upon itself at 169 and thence vertically downwardly at 170 with its corresponding free edge preferably welded to its bottom 171. The slots or guideways 165 pass through the folded portion and the vertical portion is provided with slots 172 to permit the passage of carriers 173 for the closure frame 6ᵇ. Transverse guideways 174 for these carriers are conveniently pressed into the bottom 171. The carriers are provided with passageways 175 for the reception of the closure supporting members 161 and cam slots 176 in which operate members 177 shown as actuated by a leverage system comprising working arms 178 and a common power arm 179 integral with the connecting shaft 180 pivoted at points 181. The power arm works in a slot 182 in the inner side of the door structure and preferably frictionally engages one of the sides of the slot which may conveniently be corrugated as at 183 to hold the power arm in adjusted position. The carriers are preferably connected at their outer ends by a shelf 184 which serves to brace the carrier system and also to close the guideway 164 when the closure is in operative position. The closure frame supporting members 161 are preferably beveled at their ends as at 185 to facilitate their passage into the carriers and into the base of the frame 5ᵇ. The frame 167 is covered by the usual sheathing 1', a ridge or corrugation 1″ being preferably formed therein in the rear of the closure frame 6ᵇ and parallel thereto as a weather seal. The base of the frame 6ᵇ may also advantageously be provided with an insert of mohair or other fabric, or rubber coating 186, to prevent scratching and to serve also to exclude the weather. The rear face of the forward closure frame 5ᵇ or, if desired, the front face of the closure frame 7ᵇ, is preferably provided with an expansible flexible tongue member 21 to effect when the doors are closed a contacting weather-tight seal between said frames. This feature may take any of the forms hereinabove set forth but in view of the fact that both frames have a unitary straight vertical end face, one of them may be provided with a rigid groove into which the flexible tongue of the other inserts itself, as shown for instance in Fig. 9.

To move the closure frame 6ᵇ from its position shown in Fig. 16ᵇ to operative position over the door 2″, the carriers are actuated by the arm 179 to bring their passageways 175 into alignment with the passageway 164, unless already in this position, and the closure frame 6ᵇ is then slid rearward until the rear stem 166 contacts with the end of said passageway. The frame supporting members 161 will now be centered in the passageways 175 in the carriers 173, respectively, and downward operation of the lever arm 179 causes the carriers to travel inwardly, carrying with them the closure frame. The inclined faces 187 of the supporting members 161 are engaged by the projecting faces 188 of the carriers, the rear faces 189 of the members 161 being firmly forced thereby against the vertical wall 170, forming a part of the top horizontal door frame structure, while the bottom faces of the members 161 are forced against the bottom 171. In the final position of the parts the working arms 178 should be approximately at right angles to the surface of the cam slot 176 then in contact with the cam actuating member 177 in order that the parts may be firmly locked in clamped position. This action can be further enhanced if necessary by raising the relative position of the shaft 180 and lowering that of the slot 176, causing if desired the actuating cam member 177 to pass to or through the point of dead center at the end of its throw. Engagement of the lever arm 179 with the corrugated edge 183 of its slot aids in maintaining the parts in final position. The clamping action is very effective because the supporting members 161 are forced by wedging action into the angle formed by the surface of the vertical wall 170 and the surface of the bottom 171, the forces being applied by the projections 188 on the bases or bottoms 187 of the respective triangles or wedges. After the frame 6ᵇ has been firmly anchored in place, the frame 7ᵇ is slid rearwardly, as in the preceding forms, into its position over the stationary body section 3″, the free edges of the body and top in this section being drawn slightly towards each other as at x to permit the provision of the guiding grooves 144', therein, for the sliding frame 7ᵇ.

In the form shown in Fig. 14ᵃ the front end member 14ᵉ of the main closure frame 12ᵉ and in the form shown in Fig. 16ᵇ the corresponding front end members of the frames 5ᵇ and 6ᵇ, preferably slide in a pocket formed by an extension 190, of the door front, conveniently made of thin sheet metal, both the extension and the end members preferably lying entirely within and the end members sliding within the recess 191 in the windshield post 18ᵇ. The post is conveniently made from a rectangular sheet metal blank by bending each of its sides into a rectangular tubular form, as shown at 192 and 193, the edges preferably being welded along their full length to the main body portion of the blank to add strength to the structure. In order to insure the proper fit of the end member in the recess 191 above the extension or pocket 190, the sides of the recess are preferably drawn in at 194 (Fig. 16ᵉ) or lined with mohair, felt, rubber or other suitable material as at 195 (Fig. 16ᶠ). The door structure is hinged to the post structure at 18''. By this construction only the post offers any obstruction to the driver's vision, the forward closure frame member being entirely concealed therein and made to occupy a space on the interior of the post otherwise not at all utilized, while the strength of the post itself is not substantially modified by the presence of the recess.

In Figs. 17, 17ᵃ, 17ᵇ and 17ᶜ is shown the manner of connecting my posts to the car top framework and a specific construction of the latter, whereby the strength inherent in the posts is most fully and efficiently utilized while at the same time the top structure itself is rendered unusually strong even though the usual intermediate supporting posts be omitted, as contemplated in the systems disclosed herein. To this end the top side frame members 200 are advantageously of substantially tubular construction, bent to conform to the desired configuration of the eaves and door frame head. As shown, each side member is provided with a horizontal flattened portion r', curved portion s', vertical portion t' and flange portion u', the free edge of the portion r' preferably being welded or flanged downwardly and riveted to the portion t' to obtain the strength and rigidity characteristic of a tube, combined with that of a T-beam, with a minimum of weight. Upon the flanged portion u' may conveniently rest the top ribs v', advantageously made of sheet metal U-shaped in cross section with downturned ends appropriately secured to the portion t'. The top body or stiffening portion 200', if employed, is preferably of some non-vibrating material which will neither generate nor transmit sound. The top finish material and inner lining may be applied as shown in dotted lines in Fig. 17ᶜ, the free edge of the latter together with that of the door buffer lining, if employed, conveniently being secured between the members u' and v'. The side frame members 200 are welded or riveted to the tops and inner sides of the respective windshield posts 18, the vertical walls t' of the former, or the corresponding sides of the posts, or both in overlapping relationship, being preferably curved across the angle at w', to form angle brace members both in the front and in the rear of the post. Similarly connected between the tops of the posts is the front frame member 201, preferably of rectangular tubular construction with its rear side z preferably welded to the free edge of the side z' and projected downwardly below the same to form an abutment frame for the windshield. Should a sliding windshield be employed, a guideway may be provided between the parts z and z'. A tubular frame member 202 may similarly connect the posts at the bottom of the windshield frame. In each instance the corners are preferably braced by curving the frame members to bridge the angles between them and the posts, as at w'', and similar connections may be made between the front member 201 and the side members 200. In order to further reduce the leverage tending under strain to turn the posts about their top connections as fulcrums, it would be advantageous, in fact, to give a substantially elliptical outline to the front frame constituted of the posts 18 and members 201 and 202, the portions of the posts adjacent the major axis of the ellipse being sufficient for vision. A like treatment would also be advantageous at the front and rear connections of the side frame members 200 to their supporting members. The posts 18 are preferably welded, riveted, or bolted at their bottoms to the floor frame of the body.

While in accordance with the patent statutes, I have disclosed the best modes contemplated by me of applying the fundamental principles of my invention, I do not wish to be limited to the particular modes given as illustrative examples but aim to cover all equivalent modes of applying these principles, both as to the combinations and as to the sub-combinations disclosed.

I claim:

1. In a vehicle construction, or the like, in combination: a body, provided with sides having doors thereon and a top supported on each side, at the rear, by the body rear structure and at its front by the windshield post with unobstructed free space therebetween; said top being provided with a closed tubular side frame member, having a downwardly extending flange; a windshield post provided with a vertical groove or recess on its rear side, and a closure provided with a frame, slidable in the door, the top member of said frame when closed abutting said flange and the front end member of said frame lying substantially within said groove or recess; the top frame structure being provided with a hinged device in alignment with the car door hinges and adapted to engage the adjacent top end of said closure when raised.

2. In a vehicle construction in combination: a body having top and sides, said sides being divided into sections, some of which at least are doors, the spaces between said sides and top being free and unobstructed, said sides being provided with pockets, slidable closure means in said pockets actuated by the sliding of said closures into final raised positions, to effect a contacting weather-tight seal between adjacent closures and a firm connection between the doors and their closures, the door closure means, in final raised position, maintaining said firm connections while permitting free and unrestricted opening of any door, and being actuated, after any door has been opened, to again effect the normal contacting weather-tight seal between adjacent closures, without special manipulation, or modification of said firm connection, merely by the movement of said door to closed position.

3. In a vehicle construction in combination:

a body having sides divided into sections, some of which at least are doors, said sides being provided with pockets, slidable closures in said pockets actuated by the sliding of said closures into fully raised positions to effect a contacting weather-tight seal between adjacent closures and a firm connection between the doors and their closures, said closures, in final raised position, maintaining said firm connections while permitting free and unrestricted opening of any door, and being actuated, after any door has been opened, to again effect the normal contacting weather-tight seal between adjacent closures, without special manipulation, or modification of said firm connections, merely by the movement of said doors to closed position.

4. In a vehicle construction in combination; adjacent doors provided with closures, and storage pockets therefor, said closures being provided with means respnsive to the moving of the cloures from said pockets to final raised position to effect an extension of the area of the closures to bridge the space between said closures and an adjacent member and to effect a firm connection between the doors and their closures, the door closure means, in final raised position, maintaining said firm connections while permitting free and unrestricted opening of any door, and being actuated, after any door has been opened, to again effect the normal contacting weather-tight seal between adjacent closures, without special manipulation, or modification of said firm connections, merely by the movement of said door to closed positions.

5. In a vehicle construction, or the like, in combination: a body having sides divided into sections, some of which at least are doors, said sides being provided with pockets; slidable closures in said pockets, certain of said pockets being of restricted depth, less than the height of the normal closure, the corresponding closures comprising upper and lower sections, each section being of less vertical dimension than said restricted pocket and one section being slidable alongside the other into storage position in said pockets of restricted depth, said closures and sections being provided with means operating upon merely sliding them into operative positions to effect a weather-tight seal between them.

6. In a vehicle construction, or the like, in combination: a body having a side provided with a pair of doors whose free edges lie in close proximity to each other; pockets in said doors; and closures in said pockets, actuated by the sliding thereof into final raised position to form a weather-tight seal therebetween, permitting free and unrestricted opening of either of said doors and actuated, after any door has been opened, to again effect normal weather-tight seal, merely by movement of the door to closed position.

7. In a vehicle construction, or the like, in combination: a side section provided with a storage pocket extending from end to end, the ends of said pocket terminating in vertical guideways of greater width than intermediate portions of said pocket; a closure having end frame members of greater width than portions of its bottom frame member, the end frame members being adapted to fit in said guideways and the bottom frame member in intermediate portions of said pocket.

8. In a vehicle body construction; a body side section provided with a storage pocket having a seat at its upper end; a slidable closure in said pocket provided with a member at its bottom adapted to tightly fit in said seat when the closure is raised, and cam means for firmly clamping said member in said seat when the closure is raised to effect a rigid connection between said seat and said closure.

9. In a vehicle construction, or the like, in combination: a body having sides comprising sections; a frame member or post at the end of a section, formed of a continuous sheet of metal bent into general rectangular shape and having its opposite sides, parallel to the side of the body, pressed inwardly toward each other, intermediate the corners, to form a guideway for a closure.

10. In a vehicle body having a side divided into sections in combination; an end post pressed out of sheet metal provided with a vertical guideway terminating at its top in a wedge-shaped seat.

11. In a vehicle construction, or the like, in combination; a body having sides and top; a door in one of said sides provided with a storage pocket; a slidable closure in said pocket provided with a recess in its top; a hinged member on said top provided with a projection adapted to seat in said recess when the closure is raised.

12. The combination as defined in claim 11, in which the hinged member is provided with means comprising a link connected at one end thereto and at the other end to the top at a point removed from the pivotal point of said member, to serve as a guide and stop for the top of said closure.

13. In a vehicle construction in combination: a body having a side comprising a pair of doors whose free edges lie in close proximity to each other, free of any intermediate stationary part; a post against the outer surface of which the inner surfaces of said pair of doors abut at their free ends; and intermeshing concave and convex portions on said surfaces to effect a weather seal therebetween.

14. In a vehicle construction in combination: a body, provided with sides and a top supported on each side, at the rear, by the body rear structure and at its front by the windshield post with unobstructed free space therebetween; said top being provided with a closed integral metallic tubular side frame member constituting with said rear body structure and windshield post, an arch member of sufficient metallic section to serve as the sole support of the car top without the use of reinforcements or intermediate posts.

15. A top side rail comprising a closed integral metallic tubular member, said tubular member being adapted to constitute the crown member of an arch of which the rear quarter and windshield post are the legs and being of sufficient metallic section to serve as the sole support for the top without the use of reinforcements or intermediate posts shaped to give the desired configuration to the eaves of the top.

16. A top side rail comprising a closed integral metallic tubular member, said tubular member being adapted to constitute the crown member of an arch of which the rear quarter and windshield post are the legs and being of sufficient metallic section to serve as the sole support for the top without the use of reinforcements or intermediate posts shaped to give the desired configuration to the eaves of the top and provided with a downwardly extending flange to constitute a door jamb.

17. A top side rail comprising an integral metallic tubular side frame member, said tubular member being adapted to constitute the crown member of an arch of which the rear quarter and windshield post are the legs and being of sufficient metallic section to serve as the sole support for the top without the use of reinforcements or intermediate posts.

18. In a vehicle construction in combination; a body side portion provided with a storage pocket having an inverted V-shaped seat at its upper end; a slidable closure in said pocket provided with an inverted V-shaped member at its bottom adapted to tightly fit in said seat when the closure is raised to maintain said closure rigid with reference to said body side portion.

19. In a vehicle construction in combination; a body side portion provided with a storage pocket having an inverted V-shaped seat at its upper end; a slidable closure in said pocket provided with an inverted V-shaped member at its bottom adapted to tightly fit in said seat when the closure is raised; and cam means for firmly wedging said member in said seat to effect a rigid connection between said side portion and said closure.

20. In a vehicle construction in combination; a body having sides divided into sections, some of which at least are doors, said sections being provided with open ended pockets, slidable closures in said pockets provided with laterally extensible portions yieldingly biased outwardly to effect contactng weather-tight seals between adjacent closures.

21. The combination as defined in claim 20 in which the laterally extensible portions make overlapping contacting weather-tight seals.

22. In a vehicle construction, in combination, a body having a side provided with doors whose free edges lie in close proximity to each other; pockets in said doors; and closures in said pockets provided with laterally extensible portions yieldingly biased outwardly to effect a contacting weather-tight seal between said closures when raised but permitting unrestricted opening and closing of either of said doors.

23. The combination as defined in claim 22 in which the laterally extensible portions make overlapping weather-tight seals when raised.

24. In a vehicle construction in combination; a closure, an open ended storage pocket therefor, said closure being provided with a laterally extensible portion yieldingly biased outwardly to effect an extension of the area of the closure to bridge the space between said closure and an adjacent member.

25. In a vehicle construction, in combination, a body side portion provided with a guideway adjacent one of its ends of a width substantially equal to the thickness of the car side; and a sliding window end frame member in, and of substantially the same width as, said guideway.

26. In a vehicle construction, in combination, a body side portion provided with a guideway adjacent one of its ends of a width substantially equal to the thickness of the car sides; and a sliding window end frame member in, and of substantially the same width as, said guideway, said frame member being of a thickness longitudinally of the car side substantially less than its width.

27. The combination as defined in claim 25 in which the closure is provided with a top frame member of substantially the same width as the end frame member.

28. In a vehicle body construction in combination; a slidable closure frame having a top frame member provided with a slot longitudinally thereof for the insertion of the pane and means for retaining the pane in place therein comprising a member of a width substantially equal to the thickness of the body side portion.

29. In a body construction for vehicles in combination, a body side section provided with a pocket for the reception of a side closure, the ends of the pocket being of greater width than the intermediate portion, and permanent posts in said section inset from the ends of the pocket to define the inner limits of the widened ends of the pocket and forming a guideway and support for said sliding closures.

30. In a vehicle closure in combination, a window having as an integral part thereof an end frame member provided on its outer side with a sheet of resilient material shaped to yieldingly bridge the space between adjacent closures.

31. The combination defined in claim 30, in which the lower end of the sheet of resilient material is slotted and reduced to enable it to automatically retract said sheet into a pocket when lowered.

32. In a vehicle closure in combination, an end frame member having an undercut recess in its outer face and a sheet of resilient material, shaped to effect weather sealing engagement with an adjacent closure, retained in place by said undercut recess.

33. In a vehicle closure in combination, an end frame member provided with a recess in its outer face having an undercut side and a sheet of resilient material attached at one edge to said end frame member and having its opposite edge retained in said undercut side of the recess, the intermediate portion of said sheet being flexibly bowed outwardly.

34. The combination as defined in claim 33, in which the end frame member and the sheet of resilient material are integral portions of the same sheet.

35. In a vehicle closure in combination, an end frame member having opposite undercut recesses in its outer face, and a sheet of resilient material bent to extend flexibly outwardly while being retained in position by engagement of its opposite edges with said undercut recesses.

36. In a vehicle closure in combination, an end frame member having a sheet of resilient material attached at one edge to its outer face, its opposite edge being free, the intermediate portion of said sheet being flexibly bent outwardly.

37. In a vehicle closure in combination, an end frame member of sheet material, the outer face of which is flexibly bent outwardly longitudinally.

38. The combination as defined in claim 37, in which the bent portion is made much thinner than the remaining portion to increase its flexibility.

39. The combination as defined in claim 37, in which the flexibly bent portion is integral with the remaining portion of the end frame member.

40. In a side closure for vehicles comprising body side sections at least one of which is a door, said door and an adjacent section being provided with window channels having open ended guideways between said door and adjacent section, windows provided with end frame members slidable in said guideways, one of said end frame members being provided with a projection, and the adjacent end frame member being provided with a depression, said projection and depression cooperating to effect a weather tight seal when the door is closed, but permitting free opening and closing of the door.

41. In a side closure for vehicles comprising body side sections at least one of which is a door, said door and an adjacent section being provided with window channels having open ended guideways between said door and adjacent section, windows provided with end frame members slidable in said guideways, one of said end frame members being provided with a projection to effect a weather seal with the adjacent end frame member when the door is closed, but permitting free opening and closing of the door.

42. In a vehicle closure, a window end frame member comprising lower and upper portions, each portion adapted to hold a corresponding window pane part, said portions being telescopic, and at least one of said portions being provided with a longitudinal opening to permit free sliding movement of the other portion.

43. The combination as defined in claim 42, in which at least the upper portion is provided with expansible means to bridge the space between it and the adjacent closure when raised.

44. In a vehicle closure, a window end frame member comprising lower and upper portions, each portion, adapted to hold a corresponding window pane part, and an open-ended guideway for said end frame member to bring adjacent closures into propinquity.

45. In a vehicle construction, in combination: a door closure provided with an extensible portion yieldingly biased outwardly to effect an extension of the area of the closure to bridge the space between it and an adjacent closure, said extensible portion yielding to transverse pressure to permit free opening and closing of the door.

46. In a vehicle construction, in combination: a door closure provided with an extensible portion yieldingly biased outwardly to effect an extension of the area of the closure to bridge the space between it and an adjacent closure, said extensible portion being provided with a cam-like face yielding to transverse pressure to permit free opening and closing of the door.

47. A vehicle body comprising a wall including two wall sections each of which provides a pocket, one of said sections being a swinging door, a pair of closure panels mounted on the respective sections, lifting and guiding means for said panels, said closure panels being independently movable out of the respective pockets to a raised position thereabove, the panels having edge portions in mutual engagement throughout their respective paths, the pockets having openings at their ends to permit the panels to remain in engagement when lowered, and resilient means effective to maintain said edges in engagement.

48. A vehicle body comprising a wall including two wall sections each of which provides a pocket one of said sections being a swinging door, a pair of closures mounted on the respective sections, said closures being independently movable out of the respective pockets to a raised position thereabove, the closures having edge portions in mutual engagement throughout their respective paths, the pockets being open at their ends to permit the closures to remain in engagement when lowered.

49. In a vehicle construction in combination; a body having a side divided into sections, at least one of which is a door, there being a free and unobstructed space above said side, said sections being provided with closure pockets having open ends and substantially continuous with each other from front to rear, slidable closures extending through said open ends when in lowered position and adapted by simply rising to completely bridge the space above said side.

50. In a vehicle construction in combination; a body having a side divided into sections, at least one of which is a door, there being a free and unobstructed space above said side, said sections being provided with closure pockets having open ends permitting the pockets to be in substantially continuous intercommunication with each other from front to rear, slidable closure members extending through said open ends when in lowered position, and adapted to be raised to completely bridge the space above said side.

51. In a vehicle construction in combination; a body having a side divided into at least two sections, one of which is a door, closures for said sections, one of said sections being provided with a storage pocket having an open end adjacent a neighboring section, into which said closures extends when in lowered position, said closure being capable of simple vertical motion causing it to cooperate with its adjacent closure, when in raised position, to completely bridge the space above said sections.

RICHARD E. MARINE.